United States Patent
Jaffrey et al.

(10) Patent No.: US 10,151,160 B2
(45) Date of Patent: Dec. 11, 2018

(54) DRILLING FLUID MEASUREMENT SYSTEM

(71) Applicant: Cameron International Corporation, Houston, TX (US)

(72) Inventors: Andrew Jaffrey, Oldmeldrum (GB); Emanuel Gottlieb, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 214 days.

(21) Appl. No.: 15/154,748

(22) Filed: May 13, 2016

(65) Prior Publication Data

US 2017/0328152 A1    Nov. 16, 2017

(51) Int. Cl.
*E21B 21/08*  (2006.01)
*G01F 1/66*  (2006.01)
*E21B 21/01*  (2006.01)
*G01F 1/74*  (2006.01)

(52) U.S. Cl.
CPC .............. *E21B 21/08* (2013.01); *E21B 21/01* (2013.01); *G01F 1/66* (2013.01); *G01F 1/662* (2013.01); *G01F 1/74* (2013.01); *G01F 1/667* (2013.01)

(58) Field of Classification Search
CPC ......... E21B 21/08; E21B 33/061; B04B 5/10; B04C 9/00; B01D 21/34; B01D 21/2405; B01D 21/245; B01D 21/283; G01F 1/66
See application file for complete search history.

(56) References Cited

U.S. PATENT DOCUMENTS

| | | | |
|---|---|---|---|
| 4,807,469 A | 2/1989 | Hall | |
| 4,878,382 A | 11/1989 | Jones et al. | |
| 4,904,603 A | 2/1990 | Jones et al. | |
| 6,257,354 B1 | 7/2001 | Schrader et al. | |
| 2001/0035312 A1* | 11/2001 | Han | E21B 47/101 181/115 |
| 2011/0214882 A1* | 9/2011 | Santos | E21B 21/08 166/373 |
| 2012/0037361 A1* | 2/2012 | Santos | E21B 21/08 166/250.08 |
| 2013/0192841 A1* | 8/2013 | Feasey | E21B 21/08 166/336 |
| 2013/0291650 A1* | 11/2013 | Brown | G01F 1/662 73/861.28 |
| 2016/0273286 A1* | 9/2016 | Britton | E21B 47/10 |

OTHER PUBLICATIONS

Bloys, Ben et al., Designing and Managing Drilling Fluid, Apr. 1994, pp. 33-43, http://69.18.148.110/~/media/Files/resources/oilfield_review/ors94/0494/p33_43.pdf.
Norman, Jason, Coriolis Sensors Open Lines to Real-Time Data, Sep. 21, 2011, pp. 1-5, http://www.drillingcontractor.org/coriolis-sensors-open-lines-to-real-time-data-10682.

\* cited by examiner

*Primary Examiner* — Brad Harcourt

(74) *Attorney, Agent, or Firm* — Helene Raybaud

(57) ABSTRACT

Embodiments of the present disclosure relate to a drilling fluid system that includes a conduit configured to convey a fluid from a first sub-system of the drilling fluid system to a second sub-system of the drilling fluid system, an ultrasonic measurement system configured to determine a flow rate of the fluid in the conduit, and a controller configured to receive feedback from the ultrasonic measurement system and to adjust one or more operating parameters of the drilling fluid system based at least on the feedback.

19 Claims, 6 Drawing Sheets

DRILLING FLUID MEASUREMENT SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, such as mineral extraction systems, a variety of flow meters may be used to determine a flow rate of one or more fluids from a drilling surface toward a well, or vice versa. For example, in mineral extraction systems, mechanical flow meters (e.g., Coriolis meters) may be included in a drilling fluid system to determine a flow rate of the drilling fluid entering and/or exiting the well. Unfortunately, mechanical flow meters may contact the drilling fluid within the drilling fluid system, thereby subjecting the mechanical flow meter to solid debris flowing through the drilling fluid system. Accordingly, it may be desirable to utilize a flow meter that may avoid contact with the drilling fluid.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
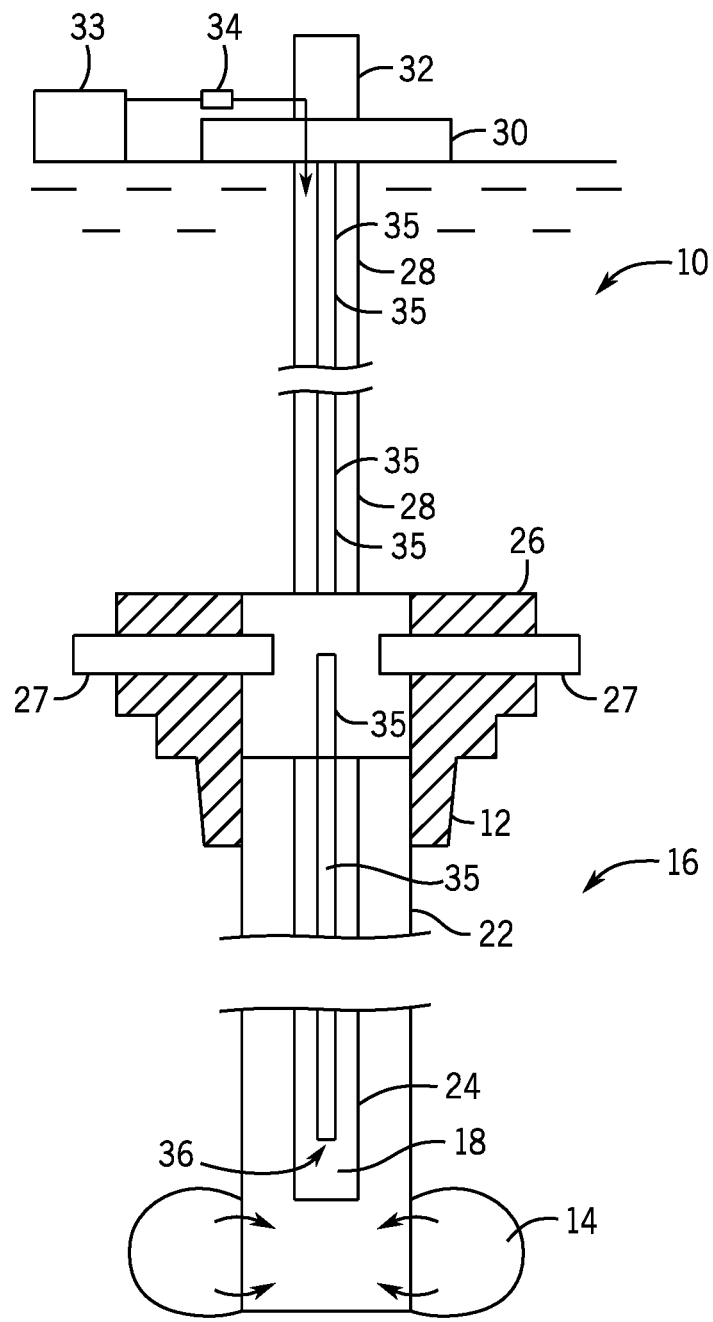
FIG. 1 is a schematic of a mineral extraction system that includes an ultrasonic measurement system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed an improved measurement system that may be utilized to determine a flow rate of drilling fluid entering and/or exiting a well. For example, drilling fluid may be utilized to facilitate movement of a drill string and/or a drill bit within the well, thereby enhancing the drilling process. Specifically, drilling fluid may remove solid particles that may be present in the well as a result of the drilling process (e.g., the drill string and/or the drill bit detach portions of a formation from the overall formation to form the well). Drilling fluids may be directed into the well and toward the drill string (e.g., the drill bit) via a drilling fluid system. The drilling fluid system may include a series of pumps and other components configured to direct a desired amount of drilling fluid toward the drill string (e.g., the drill bit). Additionally, the drilling fluid system may include sub-systems that may remove large solid particles and/or waste from the drilling fluid, such that the drilling fluid may be recycled.

In some cases, characteristics of the drilling fluid may affect drilling performance. For example, drilling performance may be based on a density of the drilling fluid, a viscosity of the drilling fluid, a solids content of the drilling fluid, and/or a type of drilling fluid, among other factors. The characteristics of the drilling fluid may be determined at least partially from the flow rate of the drilling fluid. Accordingly, a flow meter that determines the flow rate of the drilling fluid through the drilling fluid system may be desired to provide indications of various characteristics of the drilling fluid.

However, traditional flow meters designed to measure a flow rate of drilling fluid may be exposed to the drilling fluid (e.g., a Coriolis flow meter disposed in a conduit configured to convey the drilling fluid). Harsh conditions within conduits conveying the drilling fluid may subject traditional flow meters to wear (e.g., erosion, corrosion, etc.), thereby reducing a life span of the flow meter. Accordingly, it is now recognized that ultrasonic flow meters may be desirable to measure the flow rate of drilling fluid at various points along a drilling fluid system because such flow meters may be isolated from the drilling fluid (e.g., ultrasonic flow meters may not directly contact the drilling fluid). Further, ultrasonic flow meters may provide the flow rate of the drilling fluid through a conduit with enhanced accuracy when compared to traditional flow meters.

To help illustrate the manner in which the present embodiments may be used in a system, FIG. 1 is a block diagram that illustrates an embodiment of a mineral extraction system 10. The illustrated mineral extraction system 10 can be configured to extract various minerals and natural resources, including hydrocarbons (e.g., oil and/or natural gas), or configured to inject substances (e.g., drilling fluid) into the earth. In some embodiments, the mineral extraction system 10 is land-based (e.g., a surface system) or subsea (e.g., a subsea system). As illustrated, the system 10 includes a wellhead assembly 12 coupled to a mineral deposit 14 via a well 16, wherein the well 16 includes a well-bore 18.

The wellhead assembly 12 typically includes multiple components that control and regulate activities and conditions associated with the well 16. For example, the wellhead assembly 12 generally includes pipes, bodies, valves and seals that enable drilling of the well 16, route produced minerals from the mineral deposit 14, provide for regulating pressure in the well 16, and provide for the injection of drilling fluids into the well-bore 18 (down-hole). For example, FIG. 1 illustrates a conductor 22 (also referred to as "conductor casing") disposed in the well 16 to provide structure for the well 16 and prevent collapse of the sides of the well 16 into the well-bore 18. One or more casings 24, such as surface casing, intermediate casing, etc., may be fully or partially disposed in the bore of the conductor 22. The casing 24 also provides a structure for the well 16 and well-bore 18 and provides for control of fluid and pressure during drilling of the well 16. The wellhead 12 may include, a tubing spool, a casing spool, and a hanger (e.g., a tubing hanger or a casing hanger), to enable installation of casing and/or tubing. The system 10 may include other devices that are coupled to the wellhead 12, such as a blowout preventer (BOP) 26 and devices that are used to assemble and control various components of the wellhead 12.

The BOP 26 may include a variety of valves, fittings and controls to prevent oil, gas, or other fluid from exiting the well in the event of an unintentional release of pressure or an unanticipated overpressure condition. As used herein the term "BOP" may also refer to a "BOP stack" having multiple blowout preventers. The BOP 26 may be hydraulically operated and may close the wellhead assembly 12 or seal off various components of the wellhead assembly 12. During operation of the system 10, a BOP 26 may be installed during removal or installation of additional components, changes in operation of the system 10, or for other reasons. The BOP 26 may be any suitable BOP, such as a ram BOP, an annular BOP, or any combination thereof. The BOP 26 shown in FIG. 1 may be a ram BOP having radially moveable rams 27 configured to close off the bore of the BOP 26 and seal the well 16.

A drilling riser 28 may extend from the BOP 26 to a rig 30, such as a platform or floating vessel. The rig 30 may be positioned above the well 16. The rig 30 may include the components suitable for operation of the mineral extraction system 10, such as pumps, tanks, power equipment, and any other components. The rig 30 may include a derrick 32 to support the drilling riser 28 during running and retrieval, a tension control mechanism, and any other components.

The drilling riser 28 may carry drilling fluid (e.g., "mud") from the rig 30 to the well 16, and may carry the drilling fluid ("returns"), cuttings, or any other substance, from the well 16 to the rig 30. For example, in certain embodiments, the mineral extraction system 10 may include a drilling fluid system 33 that directs the drilling fluid from a source, into the well 16, and back out of the well 16 to a predetermined destination (e.g., a waste container or a reserve pit). The drilling fluid system 33 may include an ultrasonic measurement system 34 that may be utilized to determine a flow rate and/or conditions of the drilling fluid directed into the well 16. The drilling riser 28 may also include a drill pipe 35. The drill pipe 35 may be connected centrally over the bore (such as coaxially) of the well 16, and may provide a passage from the rig 30 to the well 16.

FIG. 1 depicts operation of the mineral extraction system 10 during drilling of the well. As shown in FIG. 1, the drill pipe 35 extends from the derrick 32 through the BOP 26, through the drilling riser 28, and into the well-bore 18. The drill pipe 35 may be coupled to a tool, e.g., a drill bit, to aid in drilling the well. For example, in one embodiment the drill pipe 35 may be rotated and/or translated to drill and create the well. Drilling fluid may be directed toward an end 36 of the drill pipe 35 to facilitate movement of the drill pipe 35 and/or the tool (e.g., drill bit) within the well 16. Specifically, the drilling fluid may remove the cuttings and/or other solids from the end 36 of the drill pipe 35 that may block movement of the drill pipe 35 and/or the drill bit. Additionally, the drill pipe 35 may be extended or retracted by adding or removing sections to the drill pipe 35.

Figure 2:
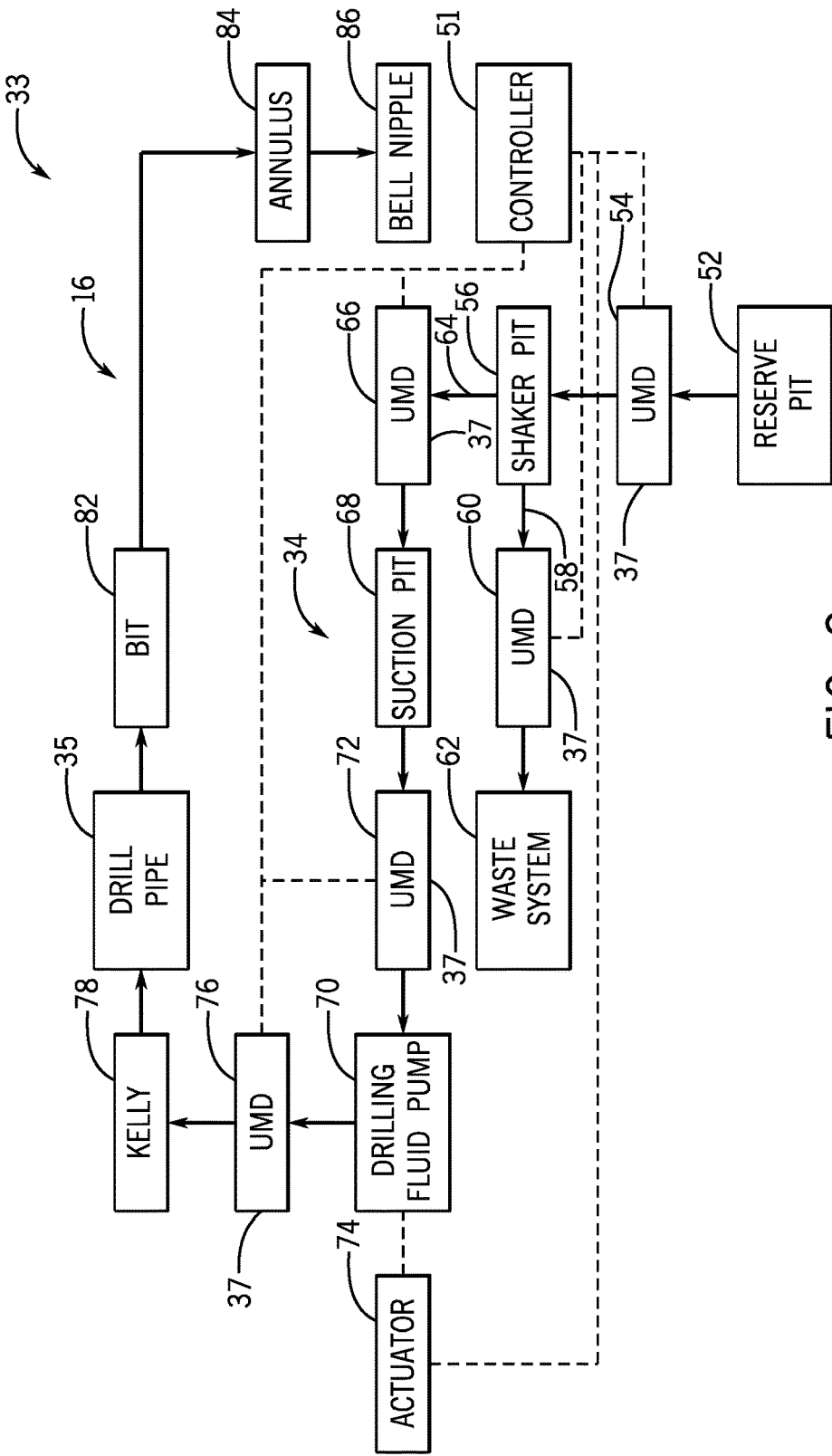
FIG. 2 is a schematic of a drilling fluid system that includes one or more of the ultrasonic measurement systems of FIG. 1, in accordance with an embodiment of the present disclosure.

As discussed above, the ultrasonic measurement system 34 may include one or more ultrasonic measurement devices 37 (e.g., ultrasonic flow meters) that measure a flow rate of the drilling fluid directed toward the end 36 of the drill pipe 35. For example, one or more ultrasonic measurement devices 37 may be included within the drilling fluid system 33 to provide feedback indicative of characteristics of the drilling fluid at predetermined locations of the drilling fluid system 33. For example, FIG. 2 is a schematic of the drilling fluid system 33 that includes the ultrasonic measurement system 34 that includes ultrasonic measurement devices 37 (e.g., ultrasonic probes, sensors, transducers, or meters, such as flow meters) at various locations along the drilling fluid system 33. Individual ultrasonic measurement devices 37 may be coupled to a controller 51, which may be configured to control various components of the drilling fluid system 33 and/or the mineral extraction system 10 based on feedback received from one or more of the ultrasonic measurement devices 37.

As used herein, the ultrasonic measurement system 34 may include an ultrasonic measurement device 37, a processor, a memory device, and/or other components configured to send and/or receive feedback indicative of the drilling fluid characteristics. The ultrasonic measurement device 37 may include one or more ultrasonic transducers that emit sound pulses at an ultrasonic frequency (e.g., frequencies between 20 kilohertz (kHz) and 500 kHz, between 20 kHz and 400 kHz, or between 40 kHz and 300 kHz) into a flow path of the drilling fluid. For example, the ultrasonic transducer may measure a time that it takes for an ultrasonic sound pulse (e.g., a sound wave at an ultrasonic frequency) to travel from a first ultrasonic transducer, through the flow path of the drilling fluid to a receiver of a corresponding second ultrasonic transducer. The transit time (e.g., travel time) of the ultrasonic pulse may be affected by a flow rate of the drilling fluid and/or conditions of the drilling fluid (e.g., density, viscosity, and/or a solids content).

For example, a travel time of the ultrasonic sound pulse may be determined based at least on a distance (e.g., length) between the first ultrasonic transducer and the second ultrasonic transducer, the speed of sound, and/or a flow rate (e.g., velocity) of the drilling fluid in the conduit. The ultrasonic measurement system 34 may be configured to determine both an upstream travel time (e.g., a time that it takes the ultrasonic sound pulse to travel from the first ultrasonic transducer disposed downstream of the second ultrasonic transducer with respect to the flow of the drilling fluid) and a downstream travel time (e.g., a time that it takes the ultrasonic sound pulse to travel from the first ultrasonic transducer disposed upstream of the second ultrasonic transducer with respect to the flow of the drilling fluid). For example, the upstream travel time (e.g., $t_{up}$) may be determined by Equation 1.

$$t_{up}=L/(c-v) \qquad (1)$$

Similarly, the downstream travel time (e.g., $t_{down}$) may be determined by Equation 2.

$$t_{down}=L/(c+v) \qquad (2)$$

In Equations 1 and 2, "L" represents the distance (e.g., length) between the first ultrasonic transducer and the second ultrasonic transducer, "c" represents the speed of sound, and "v" represents the flow rate (e.g., velocity) of the drilling fluid in the conduit. Accordingly, the controller 51 may determine the upstream travel time and/or the downstream travel time based on the flow rate of drilling fluid (e.g., the distance between the first and second ultrasonic transducers and the speed of sound are substantially constant). Similarly, the controller 51 may determine flow rate of the drilling fluid based on the upstream travel time and/or the downstream travel time by manipulating Equation 1 and/or Equation 2.

Additionally, the ultrasonic transducers and/or a controller may also be utilized to measure (or calculate) a density, a specific weight, a specific gravity, a viscosity, a solids content, a water content, a Reynolds number, another dimensionless fluid parameter, a direction of flow, and/or any other suitable parameter of the drilling fluid. In some embodiments, the flow rate of the drilling fluid may be utilized to determine a characteristic of the drilling fluid. For example, an increase in the flow rate of the drilling fluid may be indicative of a reduced density and/or solids content. Similarly, a reduction in the flow rate of the drilling fluid may be indicative of an increased density and/or solids content.

Ultrasonic transducers (and thus the ultrasonic measurement system 34) may not include moving parts, thereby enhancing a reliability of the ultrasonic measurement system 34. Additionally, the ultrasonic transducers may not be exposed to the drilling fluid, thereby further enhancing the reliability of the ultrasonic measurement system 34 by reducing any potential damage caused by exposure to the drilling fluid. The ultrasonic measurement system 34 may determine information about the drilling fluid at various locations of the drilling fluid system 33.

As shown in the illustrated embodiment of FIG. 2, a supply of drilling fluid may be stored in a reserve pit 52. The drilling fluid in the reserve pit 52 may be obtained through a supplier and/or generated at the drilling site. Drilling fluid exiting the reserve pit 52 may flow through a first ultrasonic measurement device 54, which may be configured to measure a flow rate of the drilling fluid drawn from the reserve pit 52 and flowing toward a shaker pit 56. Additionally, the first ultrasonic measurement device 54 may determine various characteristics (e.g., density, viscosity, solids content) of the drilling fluid flowing toward the shaker pit 56 based at least on the measured flow rate. The first ultrasonic measurement device 54 may be coupled (e.g., wirelessly or through a wired connection) to the controller 51. Therefore, the first ultrasonic measurement device 54 may provide feedback to the controller 51 indicative of the measured flow rate and/or the characteristics of the drilling fluid flowing from the reserve pit 52 toward the shaker pit 56. Accordingly, the controller 51 may adjust operating conditions of the drilling fluid system 33 and/or the mineral extraction system 10 based on the feedback from the first ultrasonic measurement device 54.

In certain embodiments, the shaker pit 56 may be configured to remove particles (e.g., cuttings) from the drilling fluid before the drilling fluid enters the well 16. For example, the shaker pit 56 may include a filter (e.g., a mesh screen or other filtering device) configured to remove solid particles that are larger than a predetermined size. Specifically, the shaker pit 56 may be configured to vibrate (e.g., shake) at a predetermined frequency to remove particles from the drilling fluid (e.g., via the filter). Drilling operations may be enhanced by removing large particles from the drilling fluid because obstructions in the well that may be caused by the large particles may be substantially avoided.

In certain embodiments, a first portion 58 of the drilling fluid from the shaker pit 56 may directed to a second ultrasonic measurement device 60 configured to measure a flow rate of the drilling fluid flowing from the shaker pit 56 to a waste system 62, for example. Additionally, the second ultrasonic measurement device 60 may determine various characteristics (e.g., density, viscosity, solids content) of the fluid (e.g., solids, waste liquids, waste gases) flowing to the waste system 62 based at least on the measured flow rate. Further, the second ultrasonic measurement device 60 may be coupled (e.g., wirelessly or through a wired connection) to the controller 51. Therefore, the second ultrasonic measurement device 60 may provide feedback to the controller 51 indicative of the measured flow rate and/or the characteristics of the fluid (e.g., solids, waste liquids, waste gases) flowing from the shaker pit 56 to the waste system 62. Accordingly, the controller 51 may adjust operating conditions of the drilling fluid system 33 and/or the mineral extraction system 10 based on the feedback from the second ultrasonic measurement device 60.

In certain embodiments, a second portion 64 of the drilling fluid from the shaker pit 56 may be directed toward a third ultrasonic measurement device 66 configured to measure a flow rate of the drilling fluid flowing from the shaker pit 56 to a suction pit 68. Additionally, the third ultrasonic measurement device 66 may determine various characteristics (e.g., density, viscosity, solids content) of the drilling fluid flowing toward the suction pit 68 based at least on the measured flow rate. Further, the third ultrasonic measurement device 66 may be coupled (e.g., wirelessly or through a wired connection) to the controller 51. Therefore, the third ultrasonic measurement device 66 may provide feedback to the controller 51 indicative of the measured flow rate and/or the characteristics of the drilling fluid flowing from the shaker pit 56 to the suction pit 68. Accordingly, the controller 51 may adjust operating conditions of the drilling fluid system 33 and/or the mineral extraction system 10 based on the feedback from the third ultrasonic measurement device 66.

The suction pit 68 may store the drilling fluid that is suitable for use in the well 16 (e.g., drilling fluid that includes a predetermined solids content). Accordingly, the suction pit 68 may act as a supply to a drilling fluid pump 70, which may ultimately convey the drilling fluid into the well 16. When the drilling fluid is directed from the suction pit 68 by the drilling fluid pump 70, a fourth ultrasonic measurement device 72 may be utilized to measure a flow rate of the drilling fluid (e.g., mud) flowing toward the drilling fluid pump 70. Additionally, the fourth ultrasonic measurement device 72 may determine various characteristics (e.g., density, viscosity, solids content) of the drilling fluid flowing to the drilling fluid pump 70 based at least on the measured flow rate. The fourth ultrasonic measurement device 72 may be coupled (e.g., wirelessly or through a wired connection) to the controller 51. Therefore, the fourth ultrasonic measurement device 72 may provide feedback to the controller 51 indicative of the measured flow rate and/or the characteristics of the drilling fluid flowing from the suction pit 68 to the drilling fluid pump 70. Accordingly, the controller 51 may adjust operating conditions of the drilling fluid system 33 and/or the mineral extraction system 10 based on the feedback from the fourth ultrasonic measurement device 72.

In certain embodiments, the drilling fluid pump 70 may be configured to increase a pressure of the drilling fluid in the drilling fluid system 33, thereby directing the drilling fluid into the well 16. An actuator 74 of the drilling fluid pump 70 may be coupled to the controller 51 (e.g., wirelessly or through a wired connection), such that the speed of the drilling fluid pump 70 may be adjusted by the actuator 74. In some embodiments, the speed of the drilling fluid pump 70 may be adjusted based on the feedback received from the first ultrasonic measurement device 54, the second ultrasonic measurement device 60, the third ultrasonic measurement device 66, the fourth ultrasonic measurement device 72, and/or another ultrasonic measurement device 37 of the ultrasonic measurement system 34. For example, it may be desirable to increase a speed of the drilling fluid pump 70 when a measured flow rate of the drilling fluid (e.g., by the first, second, third, and/or fourth ultrasonic measurement devices 54, 60, 66, and/or 72) falls below a predetermined flow rate (e.g., a threshold). Similarly, it may be desirable to decrease the speed of the drilling fluid pump 70 when the measured flow rate exceeds the predetermined flow rate (e.g., a threshold). In other embodiments, the speed of the drilling fluid pump 70 may be adjusted based on other fluid parameters (e.g., a direction of flow, density, specific weight, specific gravity, viscosity, solids content, water content, Reynolds number, and/or another dimensionless fluid parameter).

Additionally, as shown in the illustrated embodiment of FIG. 2, the drilling fluid exiting the drilling fluid pump 70 may be directed toward a fifth ultrasonic measurement device 76. The fifth ultrasonic measurement device 76 may be utilized to measure a flow rate of the drilling fluid (e.g., mud) flowing to a Kelly drive 78. Additionally, the fifth ultrasonic measurement device 76 may determine various characteristics (e.g., density, viscosity, solids content) of the drilling fluid flowing to the Kelly drive 78 based at least on the measured flow rate. The fifth ultrasonic measurement device 76 may be coupled (e.g., wirelessly or through a wired connection) to the controller 51. Therefore, the fifth ultrasonic measurement device 76 may provide feedback to the controller 51 indicative of the measured flow rate and/or the characteristics of the drilling fluid flowing from the drilling fluid pump 70 to the Kelly drive 78. Accordingly, the controller 51 may adjust operating conditions of the drilling fluid system 33 and/or the mineral extraction system 10 based on the feedback from the fifth ultrasonic measurement device 76.

As used herein, the Kelly drive 78 may be a portion of the drill pipe 35 that includes features that enable a top drive (or other rotation device) to rotate the drill pipe 35 during drilling operations. For example, the Kelly drive 78 may include a shaped or splined outer surface that is configured to correspond to a shape of a receptacle of the top drive. Accordingly, the top drive may receive and grip the Kelly drive 78, such that the drill pipe 35 may rotate without slipping.

In some embodiments, the drilling fluid exiting the Kelly drive 78 may be directed toward the drill pipe 35, and thus, toward a drill bit 82. The drill bit 82 may rotate with the drill pipe 35 as it rotates due to a force applied to the Kelly drive 78 from a top drive, for example. The drill bit 82 may then break up (e.g., separate or detach) portions of the formation to create an annulus 84 in the well 16. The drilling fluid may then be utilized to remove the portions of the formation from the annulus 84 and direct such portions of the formation back toward the rig 30. Accordingly, the portions of the formation may not block rotation of the drill bit 82, thereby enabling the drill bit 82 to extend the well 16 further into the formation.

For example, as shown in the illustrated embodiment of FIG. 2, the drilling fluid may be directed from the annulus 84 toward a bell nipple 86, which may be located at, or proximate to, the rig 30. Thus, the drilling fluid may collect and carry portions of the formation away from the annulus 84 toward the rig 30. In some embodiments, the bell nipple 86 may be a portion of the casing 24 at or near the rig 30 that includes a funnel shape. Thus, the funnel shape of the bell nipple 86 may be configured to direct the drill pipe 35 into the well 16. Additionally, the bell nipple 86 may include one or more openings (e.g., apertures) configured to divert the drilling fluid directed back to the shaker pit 56.

Accordingly, when the drilling fluid again reaches the shaker pit 56, large particles that were collected in the well 16 may be filtered out from the drilling fluid and directed to the waste system 62, such that the second portion 64 of the drilling fluid may be recycled back to the suction pit 68. In certain embodiments, some drilling fluid may also be directed to the waste system 62. To maintain a sufficient amount of drilling fluid in the suction pit 68, additional drilling fluid may be periodically supplied to the suction pit 68 from the reserve pit 52. In other embodiments, the reserve pit 52 may continuously supply drilling fluid to the shaker pit 56, and thus, the suction pit 68. Further, the reserve pit 52 may be replenished with drilling fluid to maintain a sufficient amount of drilling fluid in the drilling fluid system 33.

Figure 3:
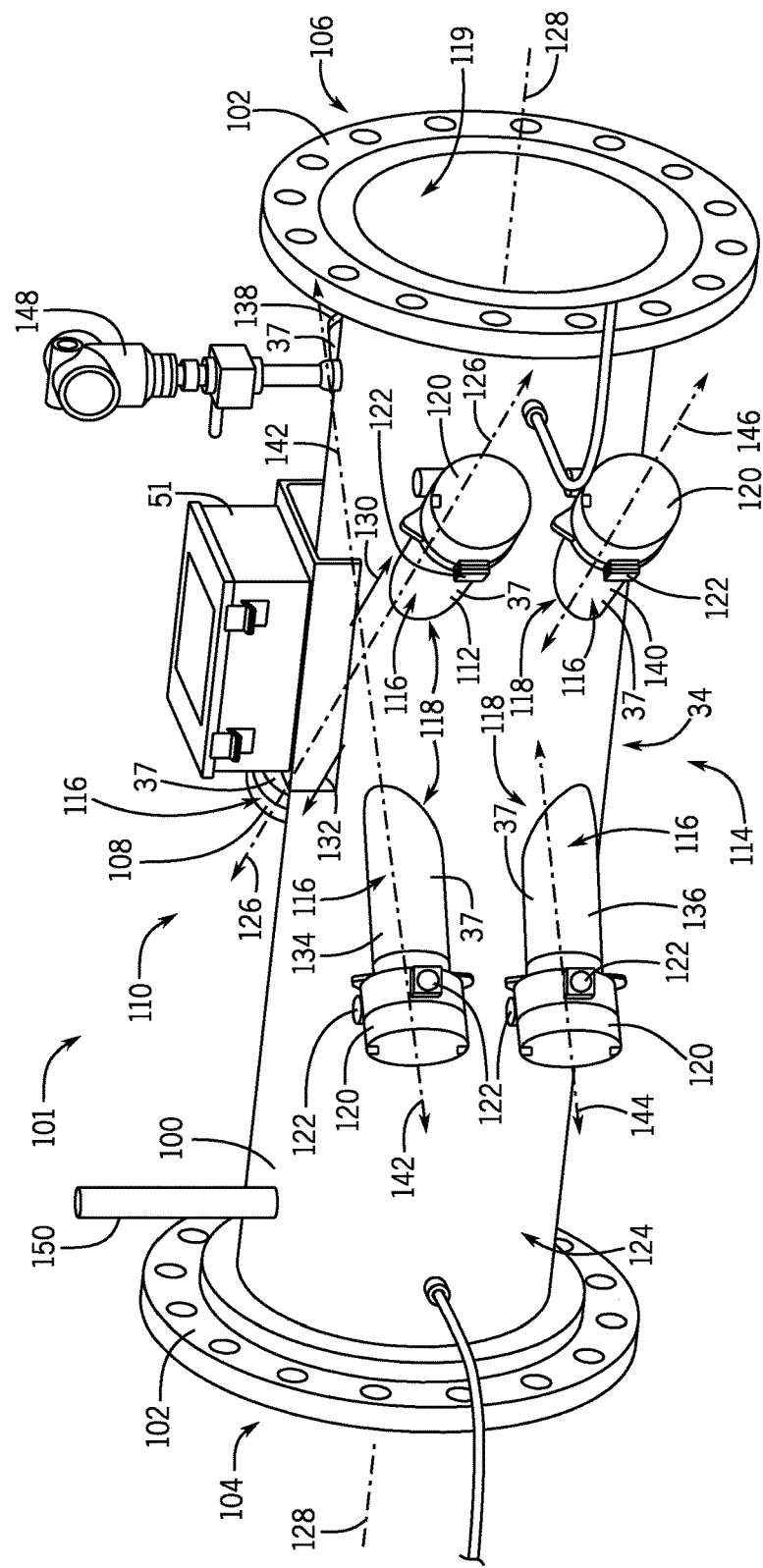
FIG. 3 is a partial perspective view of a conduit that includes the ultrasonic measurement system of FIG. 1, in accordance with an embodiment of the present disclosure.

As discussed above, the ultrasonic measurement system 34 may include ultrasonic measurement devices 37 disposed at various locations along the drilling fluid system 33. For example, FIG. 3 is a perspective view of a portion 100 of a conduit 101 that may convey the drilling fluid and a portion of the ultrasonic measurement system 34 included on the portion 100 of the conduit 101. As shown in the illustrated embodiment of FIG. 3, the portion 100 of the conduit 101 may be an annular pipe or tube that includes flanges 102 on a first end 104 and a second end 106. The flanges 102 may enable the portion 100 of the conduit 101 to couple to additional portions of the conduit 101, such that a flow path of the drilling fluid may be formed. In other embodiments, the portion 100 of the conduit 101 may include any suitable configuration that may facilitate a flow of drilling fluid.

As shown in the illustrated embodiment of FIG. 3, the ultrasonic measurement system 34 may include pairs of transducers (e.g., first and second ultrasonic transducers) on opposing sides of the conduit portion 100. For example, a first upstream transducer 108 may be disposed on a first side 110 of the conduit portion 100 and a first downstream transducer 112 may be disposed on a second side 114 of the conduit portion 100. The transducers 108 and/or 112 may include a composite Lead Zirconate Titanate (PZT) material which has enhanced signal strength when compared to conventional transducers configured to measure a flow of high viscosity drilling fluids (e.g., water-based mud, oil-based mud, and/or gel-based mud). Further, the transducers 108 and/or 112 may include a matrix of PZT and epoxy to improve an acoustic coupling coefficient of the transducers 108 and/or 112 (e.g., from 50% to 75%). In other embodiments, the transducers 108 and/or 112 may include another suitable material for measuring the flow rate of the drilling fluid.

In certain embodiments, the first upstream transducer 108 and/or the first downstream transducer 112 may be disposed in housings 116 (e.g., annular housings). In some embodiments, the first upstream transducer 108 and/or the first downstream transducer 112 may be coupled to an inner surface of the housings (e.g., via a weld). Accordingly, the housings 116 are configured to isolate the transducers 108 and/or 112 from exposure to the drilling fluid as well as the pressure in the conduit portion 100. For example, the housings 116 may be configured to withstand the harsh conditions that may be present in the conduit 101 (e.g., pressures at or exceeding 15,000 pounds per square inch (psi), pressures at or exceeding 20,000 psi, or pressures at or exceeding 22,000 psi).

In certain embodiments, the housings 116 may extend through conduit portion 100 and are sealed from the drilling fluid in the conduit portion 100. The housings 116 may be formed with the conduit portion 100 and/or the housings 116 may be separate components that are disposed in apertures 118 of the conduit portion 100 and coupled (e.g., welded) to the conduit portion 100. Accordingly, the housings 116 may include a material similar to or the same as a material of the conduit portion 100. For example, in some embodiments, the housings 116 may include a nickel-based alloy (e.g., Inconel), carbon steel, stainless steel, titanium, another suitable metal, or any combination thereof.

In some embodiments, the housings 116 may include a window (not shown) disposed in the conduit portion 100 and/or flush with an inner surface 119 of the conduit portion 100. The window may include the material of the housings 116 or the window may include a different material. For example, in some embodiments, the window may include a thin metallic wall of the housing 116 that is configured to transmit the ultrasonic sound pulses into the conduit portion 100. In such embodiments, the thin metallic wall of the housing 116 may be thick enough to withstand the harsh conditions of the conduit 101 (e.g., pressures at or exceeding 15,000 pounds per square inch (psi), pressures at or exceeding 20,000 psi, or pressures at or exceeding 22,000 psi). In other embodiments, the window may include a polyether ether ketone, polyetherimide, polyimide, and/or another suitable material incorporated into the housing 116. When the window includes such materials, the window may be transparent, thereby facilitating emission of the ultrasonic sound pulse into the conduit portion 100. As discussed above, the housings 116 may extend into the conduit portion 100 such that the housings 116 are exposed to the drilling fluid flowing through the conduit portion 100. Accordingly, in some embodiments, the housings 116 may include a protective coating (e.g., urethane or another suitable material) to reduce wear that may be caused by the drilling fluid.

Additionally, the housings 116 (e.g., annular housings) may include a removable cap 120 (e.g., annular cap) that may enable installation and/or removal of the transducers 108 and/or 112 from the housing 116. As shown, the removable cap 120 may include a fastener 122 (e.g., a threaded bolt configured to be disposed in corresponding mating threads in the housing 116) that secures the removable cap 120 to the housing 116, thereby sealing the housing 116 from an environment surrounding an outer surface 124 of the conduit portion 100. It should be recognized that the removable cap 120 may facilitate maintenance of the transducers 108 and/or 112 because the transducers 108 and/or 112 may be easily accessible by removing the cap 120.

The housings 116 may be positioned on the sides 110 and 114 of the conduit portion such that the first upstream transducer 108 and the first downstream transducer 112 are coaxially aligned (e.g., along an axis 126 extending through the housings 116 of the first upstream transducer 108 and the first downstream transducer 112). In the illustrated embodiment of FIG. 3, the housings 116 (and thus the axis 126) are angled with respect to an axis 128 extending through the conduit portion 100. For example, the axis 126 may form an angle between 5 and 160 degrees, between 25 and 150 degrees, or between 30 and 120 degrees with respect to the axis 128. In other embodiments, the axis 126 may form an angle that is substantially 90 degrees with respect to the axis 128 (see e.g., FIG. 4).

In any case, arranging the transducers 108 and 112 in such a coaxial configuration may enable the ultrasonic measurement system 34 to direct ultrasonic pulses in a first direction 130 and a second direction 132 along the axis 126. In some embodiments, the first direction 130 may be substantially similar to a direction at which the drilling fluid flows through the conduit portion 100 (e.g., co-current) and the second direction 132 may be substantially opposite the direction at which the drilling fluid flows through the conduit portion (e.g., counter-current). Therefore, the first upstream transducer 108 may be configured to emit the ultrasonic pulse as well as to receive such ultrasonic pulses from the first downstream transducer 112. Similarly, the first downstream transducer 112 may be configured to emit the ultrasonic pulse as well as to receive such ultrasonic pulses from the first upstream transducer 108. Therefore, the ultrasonic measurement system 34 may perform a comprehensive analysis of the drilling fluid flowing through the conduit portion 100. Additionally, the ultrasonic measurement system 34 may utilize feedback from both the first upstream transducer 108 and the first downstream transducer 112 to determine a direction of flow of the drilling fluid in the conduit 101 (e.g., as a result of resistance applied to the ultrasonic sound pulses by the drilling fluid).

As shown in the illustrated embodiment, the ultrasonic measurement system 34 may include a second upstream transducer 134, a third upstream transducer 136, and/or a fourth upstream transducer (not shown). Accordingly, the ultrasonic measurement system 34 may also include a corresponding second downstream transducer 138, a corresponding third downstream transducer (not shown), and a corresponding fourth downstream transducer 140. It should be noted that while the fourth upstream transducer, the corresponding third downstream transducer, and the corresponding fourth downstream transducer are not shown in the illustrated embodiment of FIG. 3, the side 110 of the conduit 101 is substantially a mirror image of the side 114. Each of the pairs of transducers may be axially aligned along a second axis 142, a third axis 144, and/or a fourth axis 146. In some embodiments, the axes 126, 142, 144, and/or 146 may form substantially the same and/or self-similar angles with the axis 128 as one another. In other embodiments, the axes 126, 142, 144, and/or 146 may form different and/or unrelated angles with the axis 128.

As discussed above, the ultrasonic transducers may be coupled to the controller 51. For example, the controller 51 may receive feedback from one or more of the transducers indicative of a flow rate of the drilling fluid in the conduit portion 100 and/or a condition (e.g., density, viscosity, and/or solids content) of the drilling fluid in the conduit 101. In some embodiments, the controller 51 may utilize the feedback to adjust operating parameters of the mineral extraction system 10, the drilling fluid system 33, or a combination thereof. Further, the controller 51 may be configured to utilize the feedback to determine whether the drilling fluid system 33 is operating efficiently (e.g., whether conduits of the drilling fluid system 33 are blocked, clogged, leaking, or otherwise experiencing abnormal operation). Further still, the controller 51 may be configured to monitor trends related to the drilling fluid using the feedback. For example, the controller 51 may identify a trend in the flow rate of the drilling fluid over time, and thus, preemptively control operating parameters of the drilling fluid system 33 utilizing the trend.

In some cases, additional sensors may be coupled to or disposed in the conduit 101. For example, in FIG. 3, a pressure sensor 148 is disposed along the conduit 101. The pressure sensor 148 may monitor a pressure of the drilling fluid through the conduit 101. Additionally, the pressure sensor 148 may be coupled to the controller 51, such that the controller 51 may receive feedback from the pressure sensor 148 indicative of the pressure in the conduit 101. Accordingly, the controller 51 may further control the mineral extraction system 10 and/or the drilling fluid system 33 based on the pressure feedback from the pressure sensor 148. Additionally, a temperature sensor 150 (e.g., a thermocouple or other device configured to measure temperature) may be disposed along the conduit 101 to measure a temperature of the drilling fluid. The controller 51 may receive feedback from the temperature sensor indicative of the drilling fluid temperature. Accordingly, the controller 51 may adjust operating parameters of the mineral extraction system 10 and/or the drilling fluid system 33 based at least partially on the drilling fluid temperature.

Figure 4:
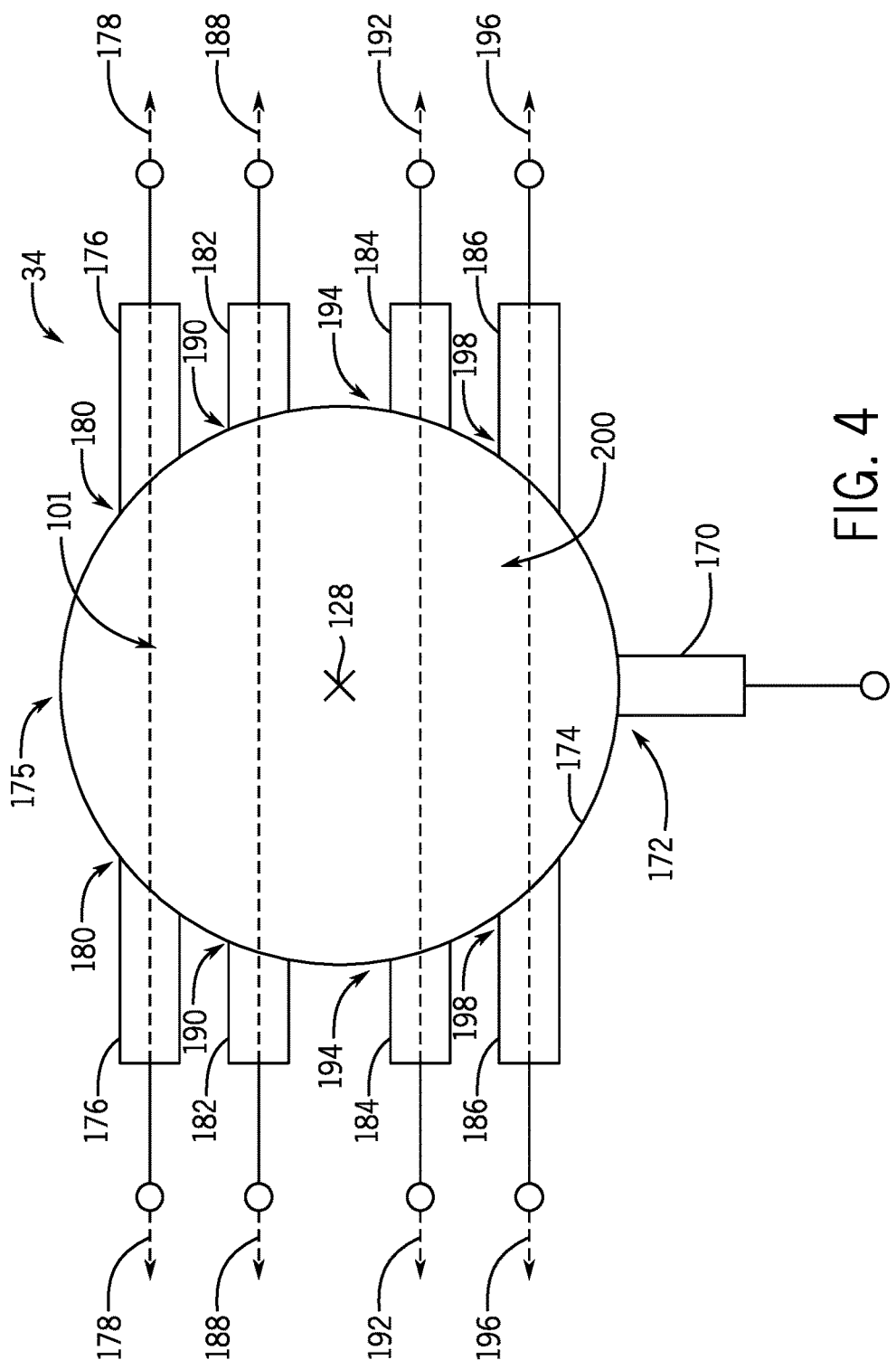
FIG. 4 is a schematic of an embodiment of the ultrasonic measurement system of FIG. 1, in accordance with an embodiment of the present disclosure.

In other embodiments, a level sensor 170 may be included along the conduit 101 to determine a volume of the drilling fluid within the conduit 101. For example, FIG. 4 is a schematic of a section of the conduit 101 that includes the level sensor 170 as well as the ultrasonic measurement system 34. As shown in the illustrated embodiment of FIG. 4, the level sensor 170 may be located at a bottom portion 172 of the conduit 101. In other embodiments, the level sensor 170 may be positioned at any other suitable location along a circumference 174 of the conduit 101 (e.g., a top portion 175). The level sensor 170 may be an ultrasonic transducer similar to those utilized in the ultrasonic measurement system 34 (e.g., the ultrasonic transducer of the level sensor 170 may emit sound pulses at an ultrasonic frequency to determine a level of fluid in the conduit 101). For example, the level sensor 170 may emit a sound pulse at an ultrasonic frequency, which may be reflected back to the level sensor 170 by the top portion 175 of the conduit, by the drilling fluid itself, and/or by a reflector located adjacent to the level sensor 170 (e.g., along the axis 128). Accordingly, a level of drilling fluid in the conduit 101 may be determined based on a travel time of the ultrasonic sound pulse from the level sensor 170, to the top portion 175, the drilling fluid, and/or the reflector, and back to the level sensor 170. In some embodiments, the longer it takes the ultrasonic sound pulse to travel, the more drilling fluid is in the conduit 101.

As shown in the illustrated embodiment of FIG. 4, the ultrasonic measurement system 34 includes four pairs of ultrasonic flow transducers disposed along the circumference 174 of the conduit 101. For example, a first pair of ultrasonic transducers 176 may be coaxially aligned with respect to an axis 178 and located at a first position 180 along the circumference 174 of the conduit 101. In some embodiments, the axis 178 of the first pair of ultrasonic transducers 176 may be substantially crosswise to the axis 128. In other embodiments, the first pair of ultrasonic transducers 176 may be disposed along the circumference 174 of the conduit 101, such that the axis 178 forms any suitable angle with the axis 128.

Additionally, the ultrasonic measurement system 34 may include a second pair of ultrasonic transducers 182, a third pair of ultrasonic transducers 184, and/or a fourth pair of ultrasonic transducers 186. In other embodiments, the ultrasonic measurement system 34 may include fewer than four pairs of ultrasonic transducers (e.g., 3, 2, or 1), or the ultrasonic measurement system 34 may include more than four pairs of ultrasonic transducers (e.g., 5, 6, 7, 8, 9, 10, or more). As shown in the illustrated embodiment of FIG. 4, the second pair of ultrasonic transducers 182 may be coaxially aligned with respect to an axis 188 and located at a second position 190 along the circumference 174 of the conduit 101. The third pair of ultrasonic transducers 184 may be coaxially aligned with respect to an axis 192 and located at a second position 194 along the circumference 174 of the conduit 101. Additionally, the fourth pair of ultrasonic transducers 186 may be coaxially aligned with respect to an axis 196 and located at a second position 198 along the circumference 174 of the conduit 101. In some embodiments, the axes 188, 192, and/or 196 may be substantially crosswise to the axis 128. In other embodiments, the axes 188, 192, and/or 196 may form any suitable angle with respect to the axis 128 (e.g., between 5 and 160 degrees, between 25 and 150 degrees, or between 30 and 120 degrees with respect to the axis 128).

In certain embodiments, positioning the pairs of ultrasonic transducers 176, 182, 184, and/or 186 at the different positions 180, 190, 194, and/or 198 may enable the ultrasonic measurement system 34 to determine a flow rate of the drilling fluid at different portions of the conduit 101. For example, when the conduit 101 is not completely full of drilling fluid, the first pair of ultrasonic transducers 176 may provide feedback (e.g., to the controller 51) indicative of no flow at the position 180. Accordingly, the ultrasonic measurement system 34 may be configured to determine the flow of drilling fluid at various locations in the conduit 101. Such a feature may be desirable for determining where blockage and/or leaks may be located in the conduit 101. In other embodiments, the pairs of ultrasonic transducers 176, 182, 184, and/or 186 may be configured as a grid or matrix, around the circumference 174 of the conduit 101, thereby covering a larger portion of a cross-sectional area 200 of the conduit 101. In such configurations, the ultrasonic sound pulses emitted by the pairs of ultrasonic transducers 176, 182, 184, and/or 186 may overlap with one another forming a checkerboard pattern with respect to paths of the ultrasonic sound pulses. Accordingly, the controller 51 may comprehensively determine the flow and/or characteristics of the drilling fluid at various locations within the cross-sectional area 200 of the conduit 101.

Figure 5:
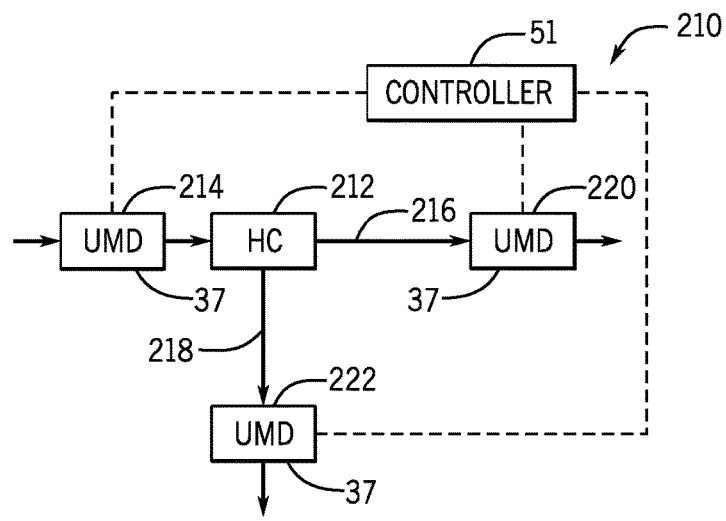
FIG. 5 is a schematic of an embodiment of a hydrocyclone sub-system that may be included in the drilling fluid system of FIG. 2 and that includes one or more of the ultrasonic measurement systems of FIG. 1, in accordance with an embodiment of the present disclosure.

In some embodiments, the drilling fluid system 33 may have additional features that may remove solids from the drilling fluid and/or otherwise prepare the drilling fluid before the drilling fluid is directed into the well 16. For example, FIG. 5 is a schematic of a hydrocyclone system 210 that may be included in the drilling fluid system 33. As shown in the illustrated embodiment of FIG. 5, the drilling fluid may be directed to a hydrocyclone 212 from the shaker pit 56, for example. In other embodiments, the drilling fluid may be directed to the hydrocyclone 212 from the bell nipple 86, the reserve pit 52, and/or another component of the drilling fluid system 33. In still further embodiments, the drilling fluid directed to the hydrocyclone 212 may bypass the shaker pit 56, such that the hydrocyclone 212 and the shaker pit 56 operate in parallel.

The drilling fluid that flows to the hydrocyclone 212 may be configured to flow through a sixth ultrasonic measurement device 214 before entering the hydrocyclone 212. The sixth ultrasonic measurement device 214 may be utilized to measure a flow rate of the drilling fluid (e.g., mud) flowing to the hydrocyclone 212. Additionally, the sixth ultrasonic measurement device 214 may determine various characteristics (e.g., density, viscosity, solids content) of the drilling fluid flowing to the hydrocyclone 212 based at least on the measured flow rate. The sixth ultrasonic measurement device 214 may be coupled (e.g., wirelessly or through a wired connection) to the controller 51. Therefore, the sixth ultrasonic measurement device 214 may provide feedback to the controller 51 indicative of the measured flow rate and/or the characteristics of the drilling fluid flowing to the hydrocyclone 212 (e.g., from the reserve pit 52, the shaker pit 56, the bell nipple 86, or another suitable source). Accordingly, the controller 51 may adjust operating conditions of the drilling fluid system 33 and/or the mineral extraction system 10 based on the feedback from the sixth ultrasonic measurement device 214.

The hydrocyclone 212 may be used to separate solids from the drilling fluid (either in combination with or in lieu of the shaker pit 56). As used herein, the hydrocyclone 212 may include a device configured to separate a solid-liquid based at least on differences in densities between a solid portion and a liquid portion of the solid-liquid mixture. For example, as shown in the illustrated embodiment of FIG. 5, the hydrocyclone 212 may output a first stream 216 that includes substantially all drilling fluid (e.g., over 80% by weight drilling fluid, over 90% by weight drilling fluid, or over 95% by weight drilling fluid) and a second stream 218 that includes substantially all solid particles, contaminants, and/or other materials that may be undesirable to include in the drilling fluid (e.g., less than 20% by weight drilling fluid, less than 10% by weight drilling fluid, or less than 5% by weight drilling fluid). The first stream 216 may flow through a seventh ultrasonic measurement device 220 and then eventually flow to the suction pit 68, for example. The seventh ultrasonic measurement device 220 may be utilized to measure a flow rate of the drilling fluid (e.g., mud) flowing from the hydrocyclone 212 to the suction pit 68, for example. Additionally, the seventh ultrasonic measurement device 220 may determine various characteristics (e.g., density, viscosity, solids content) of the drilling fluid flowing from the hydrocyclone 212 based at least on the measured flow rate. The seventh ultrasonic measurement device 220 may be coupled (e.g., wirelessly or through a wired connection) to the controller 51. Therefore, the seventh ultrasonic measurement system 220 may provide feedback to the controller 51 indicative of the measured flow rate and/or the characteristics of the drilling fluid flowing from the hydrocyclone 212 to the suction pit 68, for example. Accordingly, the controller 51 may adjust operating conditions of the drilling fluid system 33 and/or the mineral extraction system 10 based on the feedback from the seventh ultrasonic measurement device 220.

Similarly, the second stream 218 (e.g., solids) may flow through an eighth ultrasonic measurement device 222 and then eventually flow to the waste system 62. The eighth ultrasonic measurement device 222 may be utilized to measure a flow rate of the solids or other waste flowing from the hydrocyclone 212. Additionally, the eighth ultrasonic measurement device 222 may determine various characteristics (e.g., density, viscosity, solids content) of the solids or other waste flowing from the hydrocyclone 212 based at least on the measured flow rate. The eighth ultrasonic measurement device 222 may be coupled (e.g., wirelessly or through a wired connection) to the controller 51. Therefore, the eighth ultrasonic measurement device 222 may provide feedback to the controller 51 indicative of the measured flow rate and/or the characteristics of the solids or other waste flowing from the hydrocyclone 212 (e.g., to the waste system 26). Accordingly, the controller 51 may adjust operating conditions of the drilling fluid system 33 and/or the mineral extraction system 10 based on the feedback from the eighth ultrasonic measurement device 222.

Figure 6:
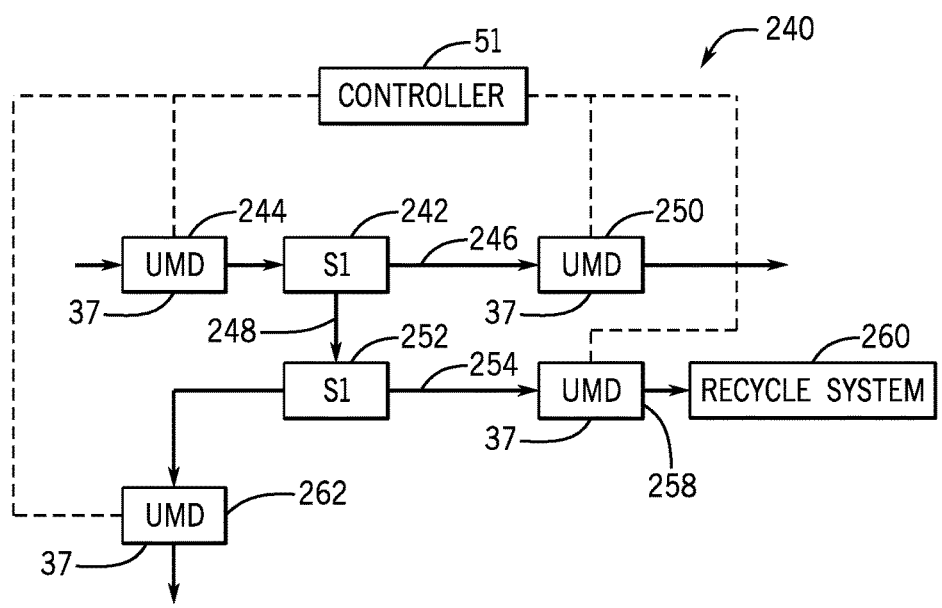
FIG. 6 is a schematic of an embodiment of a drilling fluid cleaning sub-system that may be included in the drilling fluid system of FIG. 2 and that includes one or more of the ultrasonic measurement systems of FIG. 1, in accordance with an embodiment of the present disclosure.

In other embodiments, the drilling fluid system 33 may include a mud cleaning system 240, which may be utilized to separate and/or collect recyclable materials (e.g., barite and/or sand) from the drilling fluid. For example, FIG. 6 is a schematic of the mud cleaning system 240, which may be included in the drilling fluid system 33. As shown in the illustrated embodiment of FIG. 6, the drilling fluid may be directed to a separator 242 from the shaker pit 56, for example. In other embodiments, the drilling fluid may be directed to the separator 242 from the bell nipple 86, the reserve pit 52, and/or another component of the drilling fluid system 33. In still further embodiments, the drilling fluid directed to the separator 242 may bypass the shaker pit 56, such that the separator 242 and the shaker pit 56 operate in parallel.

The drilling fluid may flow through a ninth ultrasonic measurement device 244 before entering the separator 242. The ninth ultrasonic measurement device 244 may be utilized to measure a flow rate of the drilling fluid flowing to the separator (e.g., from the reserve pit 52, the shaker pit 56, the bell nipple 86, and/or the well). Additionally, the ninth ultrasonic measurement device 244 may determine various characteristics (e.g., density, viscosity, solids content) of the drilling fluid flowing to the separator 242 based at least on the measured flow rate. The ninth ultrasonic measurement device 244 may be coupled (e.g., wirelessly or through a wired connection) to the controller 51, and thus, may provide feedback to the controller 51 indicative of the measured flow rate and/or the characteristics of the drilling fluid entering the separator 242. Accordingly, the controller 51 may adjust operating conditions of the drilling fluid system 33 and/or the mineral extraction system 10 based on the feedback from the ninth ultrasonic measurement device 244.

In some embodiments, the separator 242 may remove solid particles and/or other waste materials from the drilling fluid. For example, the separator 242 may output a first stream 246 having substantially all drilling fluid (e.g., over 80% by weight drilling fluid, over 90% by weight drilling fluid, or over 95% by weight drilling fluid). Additionally, the separator 242 may output a second stream 248 that include substantially all solid particles and/or other waste materials (e.g., less than 10% by weight drilling fluid, less than 5% by weight drilling fluid, or less than 2% by weight drilling fluid).

In some embodiments, the first stream 246 may flow through a tenth ultrasonic measurement device 250 before flowing to the suction pit 68, for example. The tenth ultrasonic measurement device 250 may be utilized to measure a flow rate of the drilling fluid flowing from the separator to the suction pit 68. Additionally, the tenth ultrasonic measurement device 250 may determine various characteristics (e.g., density, viscosity, solids content) of the drilling fluid flowing from the separator 242 based at least on the measured flow rate. The tenth ultrasonic measurement device 250 may be coupled (e.g., wirelessly or through a wired connection) to the controller 51, and thus, may provide feedback to the controller 51 indicative of the measured flow rate and/or the characteristics of the drilling fluid exiting the separator 242. Accordingly, the controller 51 may adjust operating conditions of the drilling fluid system 33 and/or the mineral extraction system 10 based on the feedback from the tenth ultrasonic measurement device 250.

Additionally, a second separator 252 may be configured to receive the second stream 248. In some embodiments, the drilling fluid may include recyclable materials (e.g., barite and/or sand) as filler additives and/or weight agents. Accordingly, when the recyclable materials (e.g., barite and/or sand) are separated from the drilling fluid in the separator 242, it may be desirable to recover the recyclable materials (e.g., barite and/or sand) for reuse in the drilling fluid system 33. For example, the second separator 252 may output a third stream 254 that includes substantially all recyclable material (e.g., over 75% by weight, over 90% by weight, or over 95% by weight recyclable material). Additionally, the second separator 252 may output a fourth stream 256 that may include substantially all waste materials (e.g., less than 25% by weight recyclable material, less than 10% by weight recyclable material, or less than 5% by weight recyclable material).

In certain embodiments, the third stream 254 may be directed to flow through an eleventh ultrasonic measurement device 258. The eleventh ultrasonic measurement device 258 may be utilized to measure a flow rate of the recyclable material flowing from the second separator 252 to a recycle system 260, for example. Additionally, the eleventh ultrasonic measurement device 258 may determine various characteristics (e.g., density, viscosity, solids content) of the recyclable material flowing from the second separator 252 based at least on the measured flow rate. The eleventh ultrasonic measurement device 250 may be coupled (e.g., wirelessly or through a wired connection) to the controller 51, and thus, may provide feedback to the controller 51 indicative of the measured flow rate and/or the characteristics of the recyclable material exiting the second separator 252. Accordingly, the controller 51 may adjust operating conditions of the drilling fluid system 33 and/or the mineral extraction system 10 based on the feedback from the eleventh ultrasonic measurement device 258.

Similarly, the fourth stream 256 may be directed to flow through a twelfth ultrasonic measurement device 262. The twelfth ultrasonic measurement device 262 may be utilized to measure a flow rate of the solids and/or other waste material flowing from the second separator 252 to the waste system 62, for example. Additionally, the twelfth ultrasonic measurement device 262 may determine various characteristics (e.g., density, viscosity, solids content) of the solids and/or other waste material flowing from the second separator 252 based at least on the measured flow rate. The twelfth ultrasonic measurement device 262 may be coupled (e.g., wirelessly or through a wired connection) to the controller 51, and thus, may provide feedback to the controller 51 indicative of the measured flow rate and/or the characteristics of the solids and/or other waste material exiting the second separator 252. Accordingly, the controller 51 may adjust operating conditions of the drilling fluid system 33 and/or the mineral extraction system 10 based on the feedback from the twelfth ultrasonic measurement device 262.

Figure 7:
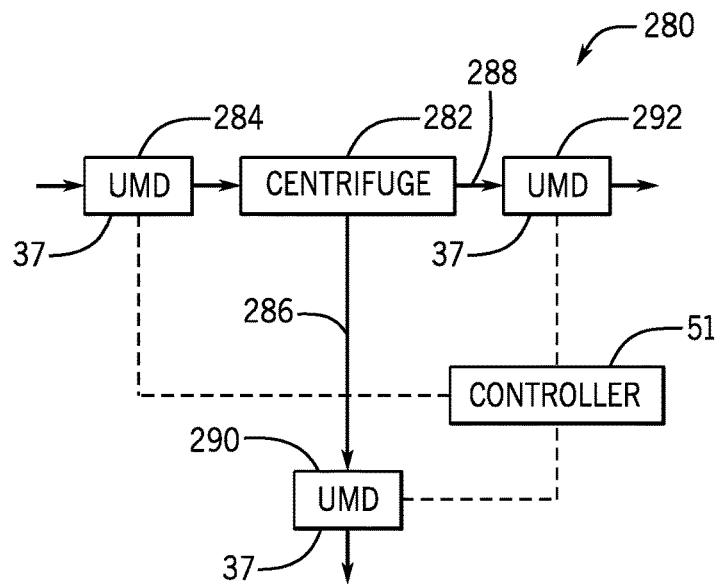
FIG. 7 is a schematic of an embodiment of a centrifuge sub-system that may be included in the drilling fluid system of FIG. 2 and that includes one or more of the ultrasonic measurement systems of FIG. 1, in accordance with an embodiment of the present disclosure.

In still further embodiments, the drilling fluid system 33 may include a centrifuge system 280. For example, FIG. 7 is a schematic of the centrifuge system 280 that may be utilized to separate solids from the drilling fluid. As shown in the illustrated embodiment of FIG. 7, the drilling fluid may be directed to a centrifuge 282 from the shaker pit 56, for example. In other embodiments, the drilling fluid may be directed to the centrifuge 282 from the bell nipple 86, the reserve pit 52, and/or another component of the drilling fluid system 33. In still further embodiments, the drilling fluid directed to the centrifuge 282 may bypass the shaker pit 56, such that the centrifuge 282 and the shaker pit 56 operate in parallel.

As used herein the centrifuge 282 may be a container configured to separate solids from the drilling fluid via rotation. For example, as the container of the centrifuge 282 rotates, solids (e.g., at least a portion of the solid particles in the drilling fluid) may be directed toward an inner surface of the container because the solids have a relatively high density (e.g., compared to liquid and/or smaller solid particles in the drilling fluid). As the solids move toward the inner surface, the solids may eventually collect in a bottom portion of the container. Additionally, liquid in the drilling fluid may move towards a center of the container (e.g., as a result of having a relatively low density when compared to the solids), and eventually rise to a top portion of the container. Accordingly, the centrifuge 282 separates the liquid and the solids from one another.

In some embodiments, the drilling fluid may flow through a thirteenth ultrasonic measurement device 284 before entering the centrifuge 282. The thirteenth ultrasonic measurement device 284 may be utilized to measure a flow rate of the drilling fluid flowing to the centrifuge 282 from the shaker pit 56, for example. Additionally, the thirteenth ultrasonic measurement device 284 may determine various characteristics (e.g., density, viscosity, solids content) of the drilling fluid flowing to the centrifuge 282 based at least on the measured flow rate. The thirteenth ultrasonic measurement device 284 may be coupled (e.g., wirelessly or through a wired connection) to the controller 51, and thus, may provide feedback to the controller 51 indicative of the measured flow rate and/or the characteristics of the drilling fluid entering the centrifuge 282. Accordingly, the controller 51 may adjust operating conditions of the drilling fluid system 33 and/or the mineral extraction system 10 based on the feedback from the thirteenth ultrasonic measurement device 284.

In some embodiments, the centrifuge 282 may be configured to separate the drilling fluid into a first stream 286 having substantially all liquid (e.g., over 75% by weight liquid, over 90% by weight liquid, or over 95% by weight liquid) and a second stream 288 having substantially all solids (e.g., less than 25% by weight liquid, less than 10% by weight liquid, or less than 5% by weight liquid). Accordingly, the liquids (e.g., the first stream 286) may be directed to the suction pit 68 and the solids (e.g., the second stream 288) may be directed to the waste system 62, for example.

In some embodiments, the first stream 286 may flow through a fourteenth ultrasonic measurement device 290 after exiting the centrifuge 282. The fourteenth ultrasonic measurement device 290 may be utilized to measure a flow rate of the liquid flowing from the centrifuge 282 to the suction it 68, for example. Additionally, the fourteenth ultrasonic measurement device 290 may determine various characteristics (e.g., density, viscosity, solids content) of the liquid exiting the centrifuge 282 based at least on the measured flow rate. The fourteenth ultrasonic measurement device 290 may be coupled (e.g., wirelessly or through a wired connection) to the controller 51, and thus, may provide feedback to the controller 51 indicative of the measured flow rate and/or the characteristics of the liquid exiting the centrifuge 282. Accordingly, the controller 51 may adjust operating conditions of the drilling fluid system 33 and/or the mineral extraction system 10 based on the feedback from the fourteenth ultrasonic measurement device 290.

Similarly, the second stream 288 may flow through a fifteenth ultrasonic measurement device 292 after exiting the centrifuge 282. The fifteenth ultrasonic measurement device 292 may be utilized to measure a flow rate of the solids and/or other waste material flowing from the centrifuge 282 to the waste system 62, for example. Additionally, the fifteenth ultrasonic measurement device 292 may determine various characteristics (e.g., density, viscosity, solids content) of the solids and/or other waste material flowing from the centrifuge 282 based at least on the measured flow rate. The fifteenth ultrasonic measurement device 292 may be coupled (e.g., wirelessly or through a wired connection) to the controller 51, and thus, may provide feedback to the controller 51 indicative of the measured flow rate and/or the characteristics of the solids and/or other waste material exiting the centrifuge 282. Accordingly, the controller 51 may adjust operating conditions of the drilling fluid system 33 and/or the mineral extraction system 10 based on the feedback from the fifteenth ultrasonic measurement device 292.

It should be understood that the drilling fluid system 33 may include any suitable combination of the shaker pit 56, the hydrocyclone system 210, the drilling fluid cleaner system 240, and/or the centrifuge system 280 to remove solids from the drilling fluid, such that the drilling fluid may reach a predetermined solids content. In other words, the systems illustrated in FIGS. 1-7 may be used in combination with one another.

Figure 8:
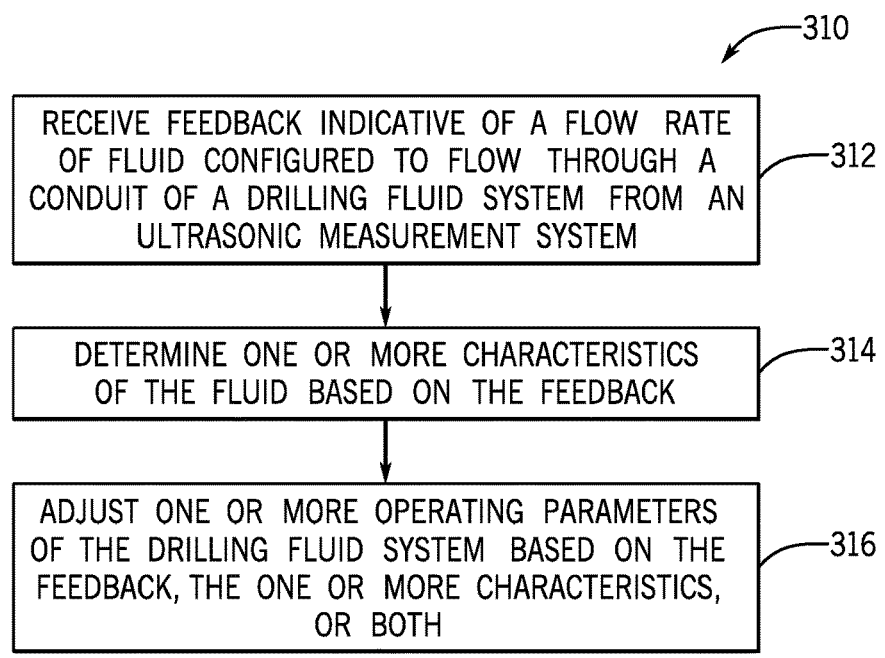
FIG. 8 is a block diagram of a process for adjusting operating parameters of the drilling fluid system of FIG. 2 based on feedback from the ultrasonic measurement system of FIG. 1, in accordance with an embodiment of the present disclosure.

As discussed above, in some embodiments, the controller 51 may be configured to adjust operating parameters of the drilling fluid system 33 and/or the mineral extraction system 10 based on feedback from one or more of the ultrasonic measurement devices 37 of the ultrasonic measurement system 34. For example, FIG. 8 is a flow chart of a process 310 that may be executed by the controller 51 to adjust operating parameters of the drilling fluid system 33 and/or the mineral extraction system based on feedback from one or more ultrasonic measurement devices 37 disposed in the drilling fluid system 33.

At block 312, the controller 51 may receive feedback indicative of a flow rate of the drilling fluid flowing through the drilling fluid system 33 (e.g., the conduit 101) from the ultrasonic measurement system 34. As described above, the ultrasonic measurement system 34 may include one or more ultrasonic measurement devices 37 disposed between various sub-systems of the drilling fluid system 33. Further, the ultrasonic measurement devices 37 may each include a pair of ultrasonic transducers. The pair of ultrasonic transducers may each be configured to emit a sound pulse at an ultrasonic frequency through the conduit 101 and/or to receive the sound pulse back from the corresponding ultrasonic transducer. Accordingly, a first ultrasonic transducer of the pair of ultrasonic transducers may emit the sound pulse into the conduit 101 at the ultrasonic frequency and a second transducer of the pair of ultrasonic transducers may receive the sound pulse from the first ultrasonic transducer. In some embodiments, the ultrasonic measurement device 37 and/or the ultrasonic measurement system 34 may determine a flow rate of the drilling fluid in the conduit 101 based at least on the time that it takes the sound pulse to travel from the first transducer, to the second transducer, and back to the first transducer.

As discussed above, the first transducer and the second transducer may be coaxially aligned within the conduit 101. Further, the first transducer may be located either upstream or downstream of the second transducer with respect to a flow of the drilling fluid through the conduit 101. Accordingly, the ultrasonic measurement system 34 may perform a comprehensive analysis of the drilling fluid by emitting the sound pulse from both the upstream transducer (e.g., the first transducer) and the downstream transducer (e.g., the second transducer).

Additionally, the controller 51 may be configured to determine one or more characteristics (e.g., density, viscosity, and/or solids content) of the drilling fluid based on the feedback received from the ultrasonic measurement system 34, as shown at block 314. For example, the controller 51 may include instructions that a processor may execute to calculate a characteristic of the drilling fluid from the feedback indicative of the flow rate through the conduit 101.

At block 316, the controller 51 may adjust one or more operating parameters of the drilling fluid system 33 based on the feedback indicative of the flow rate of the drilling fluid through the conduit 101 and/or on the characteristics of the drilling fluid determined by the controller 51. For example, the controller 51 may adjust a speed at which the drilling pump 70 operates (e.g., in real time) to adjust a flow rate of the drilling fluid based on the feedback and/or the characteristics of the drilling fluid. Additionally, the controller may adjust an operating parameter of the shaker pit 56 to increase or decrease an amount of the solids (e.g., waste) removed from the drilling fluid based on the feedback and/or the characteristics of the drilling fluid. For example, the ultrasonic measurement system 34 may determine that the drilling fluid includes a solids content above a threshold value. Therefore, the controller 51 may adjust a frequency at which the shaker pit 56 operates to increase removal of the solids from the drilling fluid. In other embodiments, the controller 51 may adjust another operating parameter of the drilling fluid system 33 that may adjust a flow rate and/or a characteristic (e.g., density, viscosity, and/or solids content) of the drilling fluid.

In still further embodiments, the controller 51 may output a signal to an operator to add liquid and/or solids to the reserve pit, such that a solids content of the drilling fluid may be maintained at a predetermined value. Additionally, the controller 51 may be configured to determine when the drilling fluid system 33 includes leaks and/or blockages that may reduce performance of the drilling fluid system 33. Accordingly, the controller 51 may signal (e.g., alert) the operator of a leak and/or blockage in the drilling fluid system 33, and more specifically, the controller 51 may provide a location where the leak and/or blockage has occurred, such that maintenance time may be reduced.

Additionally, in some embodiments, the controller 51 may be configured to continuously monitor performance of the drilling fluid system 33 and/or the mineral extraction system 10 at various locations simultaneously. Accordingly, the controller 51 may utilize an algorithm (e.g., a moving average algorithm) to analyze feedback from each of the various locations and detect deviations (e.g., a percentage change) from baseline data. For example, the controller 51 may include baseline data related to a flow rate of the drilling fluid, a density of the drilling fluid, a viscosity of the drilling fluid, a solids content of the drilling fluid, another characteristic of the drilling fluid, or a combination thereof at each of the various locations. When the controller 51 detects a deviation (e.g., a percentage change) above a threshold percentage (e.g., a deviation of greater than 5%, greater than 10%, greater than 15%, or greater than 25%), the controller may activate an indicator to signal abnormal performance to the operator. Additionally, upon detecting a deviation above the threshold percentage, the controller 51 may initiate predictive maintenance by controlling one or more components of the drilling fluid system 33 and/or the mineral extraction system 10. For example, the controller 51 may include predictive algorithms and/or other analytics that may utilize feedback from the ultrasonic measurement system 34 and determine appropriate corrective action. Therefore, the controller 51 may reduce maintenance times, thereby increasing the efficiency of the drilling fluid system 33, and thus the mineral extraction system 10.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims.

The invention claimed is:

1. A drilling fluid system, comprising:
   a conduit configured to convey a fluid from a shaker pit of the drilling fluid system to a drilling fluid pump of the drilling fluid system;
   an ultrasonic measurement system disposed between the shaker pit and the drilling fluid pump with respect to a flow of the fluid, wherein the ultrasonic measurement system is configured to determine a flow rate of the fluid in the conduit;
   a suction pit disposed between the shaker pit and the drilling fluid pump with respect to the flow of the fluid, wherein the ultrasonic measurement system is disposed between the shaker pit and the suction pit with respect to the flow of the fluid; and
   a controller configured to receive feedback from the ultrasonic measurement system and to adjust one or more operating parameters of the drilling fluid system based at least on the feedback.

2. The drilling fluid system of claim 1, wherein the ultrasonic measurement system comprises a first ultrasonic transducer configured to emit a sound pulse at an ultrasonic frequency to determine the flow rate of the fluid in the conduit.

3. The drilling fluid system of claim 2, wherein the ultrasonic measurement system comprises a second ultrasonic transducer configured to receive the sound pulse at the ultrasonic frequency.

4. The drilling fluid system of claim 3, wherein the first ultrasonic transducer is configured to determine the flow rate of the fluid in the conduit based at least on a travel time of the sound pulse from the first ultrasonic transducer to the second ultrasonic transducer.

5. The drilling fluid system of claim 3, wherein the first ultrasonic transducer and the second ultrasonic transducer are coaxially aligned along the conduit.

6. The drilling fluid system of claim 5, wherein the first ultrasonic transducer is upstream of the second ultrasonic transducer with respect to the flow of the fluid.

7. The drilling fluid system of claim 1, wherein the ultrasonic measurement system comprises an ultrasonic level sensor configured to determine a level of the fluid in the conduit, and wherein the ultrasonic level sensor is located at a bottom portion of a circumference of the conduit.

8. The drilling fluid system of claim 1, comprising a pressure sensor configured to determine a pressure in the conduit, wherein the pressure sensor is coupled to the controller, such that the controller is configured to receive additional feedback indicative of the pressure in the conduit and to adjust the one or more operating parameters of the drilling fluid system based at least on the additional feedback.

9. The drilling fluid system of claim 1, wherein the controller is configured to adjust a speed of a drilling fluid pump based on the feedback.

10. The drilling fluid system of claim 1, wherein the ultrasonic measurement system is configured to determine a solids content of the fluid in the conduit.

11. A drilling fluid system, comprising:
    a shaker pit configured to remove solid particulates from a drilling fluid and to direct the solid particulates to a waste system;
    a suction pit configured to store the drilling fluid;
    a well configured to receive the drilling fluid from the suction pit via a drilling fluid pump, wherein the drilling fluid is configured to remove cuttings from an annulus of the well;
    a bell nipple configured to direct the drilling fluid from the annulus to the shaker pit;
    an ultrasonic measurement system comprising one or more ultrasonic measurement devices, wherein an ultrasonic measurement device of the one or more ultrasonic measurement devices is positioned upstream of the drilling fluid pump with respect to a flow of the drilling fluid, and wherein the ultrasonic measurement device is configured to determine a solids content of the drilling fluid; and
    a controller configured to receive feedback from the ultrasonic measurement system indicative of the solids content of the fluid and to adjust one or more operating parameters of the drilling fluid system based at least on the feedback.

12. The drilling fluid system of claim 11, wherein the ultrasonic measurement system comprises a first ultrasonic transducer configured to emit a sound pulse at an ultrasonic frequency to determine the solids content of the fluid in the conduit.

13. The drilling fluid system of claim 11, wherein the controller is configured to increase the speed of the drilling fluid pump when the solids content of the drilling fluid at one or more of the predetermined locations falls below a threshold.

14. The drilling fluid system of claim 11, wherein the controller is configured to decrease the speed of the drilling fluid pump when the solids content of the drilling fluid at one or more of the predetermined locations exceeds a threshold.

15. The drilling fluid system of claim 11, wherein the controller is configured to increase a frequency of the shaker pit when the solids content of the fluid exceeds a threshold.

16. The drilling fluid system of claim 11, comprising one or more of a hydrocyclone, a drilling fluid cleaner, or a centrifuge downstream of the shaker pit, wherein the one or more of the hydrocyclone, the drilling fluid cleaner, or the centrifuge are configured to remove additional solid particulates from the drilling fluid.

17. A method, comprising:
receiving feedback indicative of a solids content of fluid configured to flow through a conduit of a drilling fluid system from an ultrasonic measurement system, wherein the ultrasonic measurement system is positioned upstream of a well with respect to a flow of the fluid, and wherein the well is configured to receive the fluid from the conduit;

determining one or more characteristics of the fluid based on the feedback;

adjusting one or more operating parameters of the drilling fluid system based on the feedback, the one or more characteristics, or both.

18. The method of claim 17, comprising emitting a sound pulse at an ultrasonic frequency from a first ultrasonic transducer of the ultrasonic measurement system into the conduit and receiving the sound pulse at a second ultrasonic transducer.

19. The method of claim 18, comprising determining a travel time of the sound pulse from the first ultrasonic transducer to the second ultrasonic transducer.

* * * * *